No. 714,487. Patented Nov. 25, 1902.
A. HUILLARD.
APPARATUS FOR DRYING HUMID MATERIAL.
(Application filed Aug. 19, 1902.)
(No Model.)
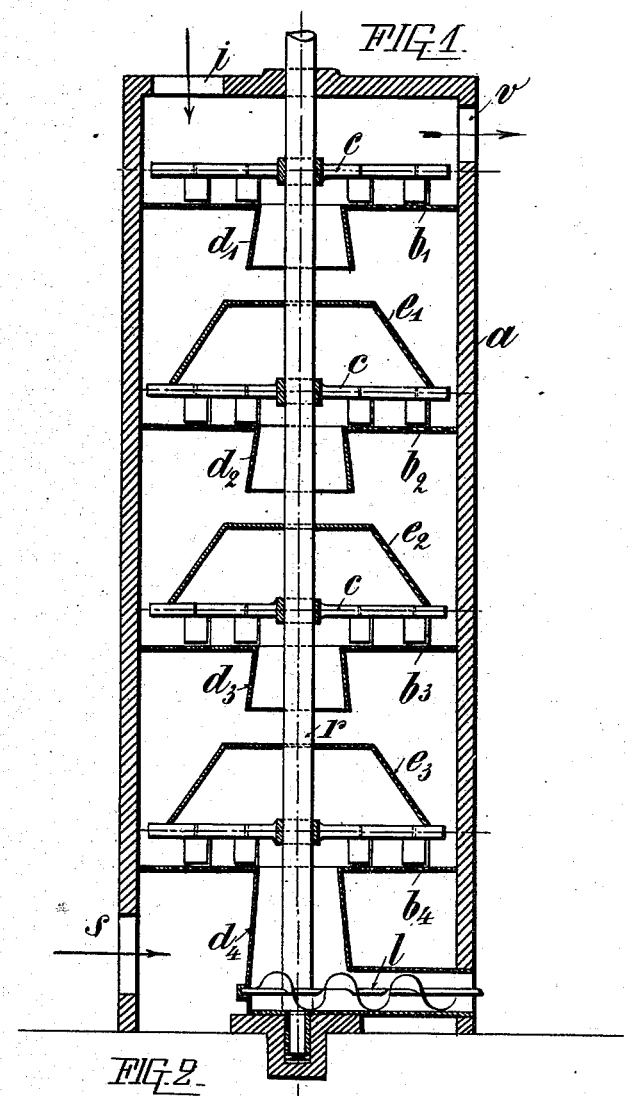
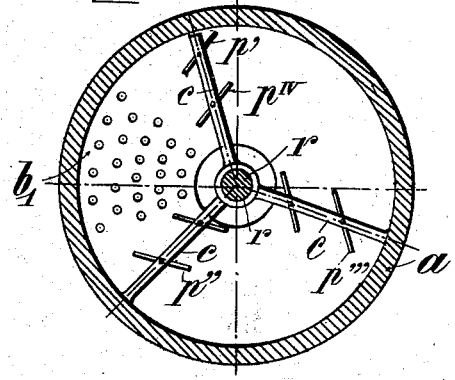
WITNESSES:
INVENTOR
Alphonse Huillard
BY
ATTORNEYS.

UNITED STATES PATENT OFFICE.

ALPHONSE HUILLARD, OF SURESNES, FRANCE.

APPARATUS FOR DRYING HUMID MATERIAL.

SPECIFICATION forming part of Letters Patent No. 714,487, dated November 25, 1902.

Application filed August 19, 1902. Serial No. 120,196. (No model.)

*To all whom it may concern:*

Be it known that I, ALPHONSE HUILLARD, engineer, a citizen of the Republic of France, and a resident of Suresnes, in the Republic of France, have invented a new and useful Apparatus for Drying Humid Material Reduced to Grains, Shavings, or Small Particles, which is fully set forth in the following specification.

This invention has for its object to construct an apparatus which will permit of a continuous drying of humid materials in a reduced state—for instance, in grains, shavings, or in small particles. The apparatus can also be employed for drying materials in paste or powder.

The various applications of this apparatus are numerous. Among the chief are the following: the drying of fecular residues, phosphates, spent tan, waste matters from tanneries or color-factories, beet or sugar-cane products, bagasse, spent grains from distilleries and breweries, and alimentary products, such as fruits and vegetables.

In order to enable the invention to be fully understood, reference is made to the accompanying drawings, in which—

Figure 1 is a vertical section of the improved apparatus, and Fig. 2 is a horizontal section thereof.

The apparatus consists, essentially, of a vertical cylinder $a$, divided horizontally into compartments by circular plates $b'$ $b^2$ $b^3$ $b^4$, having perforations more or less fine, according to the state of division of the material to be treated. In the axis of the cylinder is a rotatable shaft $r$, carrying arms $c$ above each of the plates $b'$ $b^2$ $b^3$ $b^4$. Upon these arms are fixed paddles $p'$ $p''$ $p'''$ $p^{iv}$ so disposed and arranged as to move the material to be dried toward the center of the plates.

The plates $b'$ $b^2$ $b^3$ $b^4$ have central apertures which communicate with hollow truncated cones $d'$ $d^2$ $d^3$ $d^4$. The arms $c$ in each compartment carry a truncated cone $e'$, for example, the top of which is of much larger diameter than the base of the cone $d'$, for example. The distance between these two truncated cones varies according to the state of division of the material to be treated.

The operation of the apparatus is as follows: The material is introduced at the top through an opening $i$ in such a manner that there is no entrance of air and falls near to the circumference of the circular plate $b'$. The paddle $p'$ the farthest from the center moves the material into the path of the paddle $p''$, carried upon the arm following and nearer to the center, which in turn passes it to the paddle $p'''$. Thus the material approaches nearer and nearer to the edge of the central aperture in the plate $b'$. The paddle nearest to the center causes the material to fall into the hollow truncated cone $d'$, whose greater end is at the bottom, and the material accumulates upon the platform constituted by the top of the truncated cone $e'$ until it reaches the interior of the cone $d'$. When sufficient material has accumulated, it commences to escape laterally between the two cones and falls along the conical surface of $e'$ onto the plate $b^2$, near to the circumference of the latter, when the same action is repeated, as above described. From floor to floor the material falls until it arrives at the bottom of the cylinder $a$, where it is discharged by a suitable device, such as the worm $l$, disposed so as to avoid the entrance of air. Hot gases enter the apparatus by the aperture $s$ and make their exit at the opening $v$. The circulation of the gases can be effected either by a suction or by a force pump. These hot gases pass from floor to floor in a contrary direction to the material, and their action is rendered more complete by the heaps of material in the cones $d'$ $d^2$ $d^3$, which impede the passage of the gases at the center, causing them to flow through the perforations in the plates, the material upon the latter in fine layers being constantly displaced by the moving paddles.

I claim—

An apparatus for the desiccation of humid materials reduced to grains, shavings or small particles consisting essentially of a vertical cylinder divided into compartments by means of horizontal divisions perforated and provided with a central aperture, a hollow truncated cone being arranged in each compartment beneath the opening in the division-plates and beneath this cone a concentric platform of greater diameter which constitutes the smaller end of a second truncated cone furnished at its greater end with inclined paddles arranged spirally above the floor of the compartment, the latter truncated cone, and the paddles turning with a vertical shaft which is situated in the axis of the cylinder, the materials to be dried being introduced at the upper end and the drying gases or vapors at the lower end substantially as described.

In testimony whereof I have signed this specification in the presence of two subscribing witnesses.

ALPHONSE HUILLARD.

Witnesses:
EDWARD P. MACLEAN,
AUGUSTE FORMÉ.